Jan. 13, 1970  W. R. HNOT  3,488,963
SAND STABILIZATION MACHINE

Filed Nov. 22, 1967  10 Sheets-Sheet 1

INVENTOR
WALTER R. HNOT
BY
ATTORNEY

Jan. 13, 1970  W. R. HNOT  3,488,963
SAND STABILIZATION MACHINE
Filed Nov. 22, 1967  10 Sheets-Sheet 4

INVENTOR
WALTER R. HNOT
BY
Donald F. Clifford
ATTORNEY

Jan. 13, 1970　　　　　W. R. HNOT　　　　　3,488,963
SAND STABILIZATION MACHINE

Filed Nov. 22, 1967　　　　　　　　　　10 Sheets-Sheet 9

INVENTOR
WALTER R. HNOT
BY
Donald F. Childers
ATTORNEY

Jan. 13, 1970  W. R. HNOT  3,488,963

SAND STABILIZATION MACHINE

Filed Nov. 22, 1967  10 Sheets-Sheet 10

INVENTOR
WALTER R. HNOT
BY
Donald F. Welder
ATTORNEY

United States Patent Office 3,488,963
Patented Jan. 13, 1970

3,488,963
SAND STABILIZATION MACHINE
Walter R. Hnot, Mountainside, N.J., assignor to Esso Research and Engineering Company, a corporation of Delaware
Filed Nov. 22, 1967, Ser. No. 685,151
Int. Cl. E02b *3/04;* A01c *23/02*
U.S. Cl. 61—35                    12 Claims

ABSTRACT OF THE DISCLOSURE

A mobile, self-propelled vehicle capable of traveling on a non-cohesive granular sea bed under the direction of a surface vessel varies a vibrating screen projecting into the sea bed. The vibrating screen is effective to fluidize the sea bed and at the same time inject a binder solution into the fluidized sea bed. The vibrating mechanism for driving the screen is adjustable to vary the motion pattern of the screen to provide optimum fluidization. The vibrating mechanism operates in a gas-filled submerged enclosure to reduce power losses to surrounding water.

DESCRIPTION OF THE INVENTION

This invention relates in general to binding together of non-cohesive granular materials, such as for example sand, to increase its resistance to displacement in the presence of wind or water currents. In particular, the invention relates to new and novel apparatus for injecting the binder material into a fluidized portion of granular material.

According to the invention, non-cohesive material disposed below a liquid medium is fluidized, e.g., by the direct application of a vibrating means to, and fluid binding material applied directly thereto while the non-cohesive material is in a fluidized state.

The invention, although not limited to, is particularly useful for the stabilization of underwater beds of non-cohesive materials such as the beds of estuaries, canals or rivers where they are substantially sandy in nature and the invention is particularly described with reference to this application. Those skilled in the art, however, will readily appreciate that the invention is equally useful in the stabilization of shifting sands exposed to the atmosphere. This application is an improvement over the mechanism disclosed in U.S. application Ser. No. 588,067, filed on June 16, 1966, assigned to the same assignee as the present application.

In accordance with the present invention, a mobile carriage having a roller and endless track propulsion mechanism carries a liquid binder injection means. The injection means is capable of being raised and lowered between an operative and inoperative position so that a vibrating screen carried by the carriage may be inserted below the surface portion of the granular material upon which the carriage is traveling. Means are provided on the carriage for imparting a vibration to the injection screen so as to fluidize the surface portion of the granular material to a state wherein the granular particles are receptive to the injection of a binder material from the vibrating screen. The vibrating mechanism employed includes a pair of rotating unbalanced masses which may be suitably phased and rotated to impart the desired motion to the vibrating screen in order to obtain optimized fluidization of the granular particles. The vibrating injection mechanism preferably includes an auxiliary wire screen or mesh means downstream of the injection orifices which assist in the fluidization of the granular material in a predetermined zone adjacent the injection apparatus. A feature of the invention is that a fluid tight cover or hat-like enclosure surrounds a majority of the moving parts so that the injection mechanism preferably operates in a gaseous atmosphere rather than in the environment of the surrounding sea water or liquid. In this way, needless vibration of the surrounding water is avoided and a minimum energy loss results. The traveling carriage is in one form of the invention serviced by an auxiliary surface vessel such as a tug which includes the required supply of binder material and hydraulic and electrical energy for the operation of the carriage upon the sea bottom. The carriage may employ an upstanding tower arrangement to indicate its position on the sea bottom so that appropriate tracking of the submerged carriage may be had at all times.

Accordingly, it is the principal object of the present invention to provide a new and novel mechanism for the injection of a binder material into a non-cohesive granular material.

Another object of the invention is to provide a device of the type described employing an optimized vibration imparting mechanism to fluidize submerged granular material with a minimum loss of energy to the surrounding water.

A further object of the invention is to provide an improved mechanism for the remote transportation of an injection mechanism at the bed of a river or stream.

These and other objects and advantages of the invention will be understood from the following description and drawings in which:

FIGURE 3 is a perspective view of the mobile carriage with the injecting mechanism in a raised position.

Figure 1:
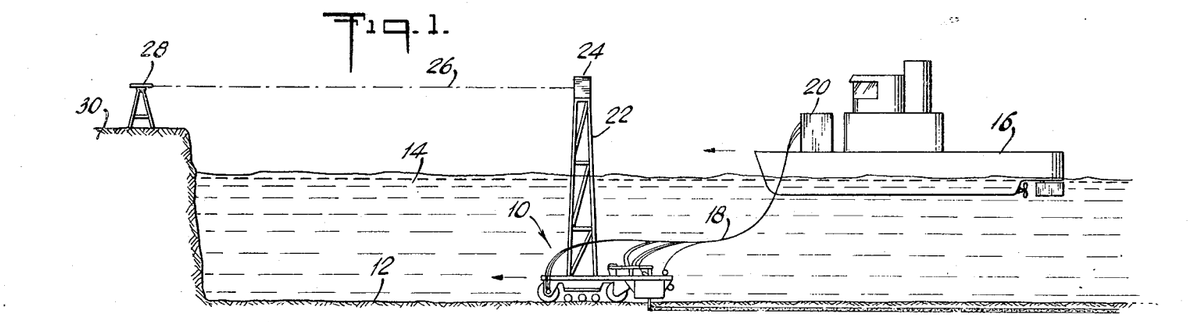
FIGURE 1 is a side elevation view of the invention in use on a typical sea or river bed;
FIURE 2 is a top plan view of FIGURE 1.

Referring to the figures, in particular, the invention concerns a sand stabilization machine 10 adapted to travel along a river or ocean bed 12 in a submerged position under a body of water 14. The stabilization machine 10 is serviced and controlled by a surface tender vessel 16 which includes a service module 20. The module 20 will be understood to provide the required electrical current, hydraulic fluid power, and sand stabilization solution to the submerged mechanism 10 through a plurality of appropriate service and control lines 18. Extending upwardly from the machine 10 is a tower structure 22 breaking the surface of the body of water 14. The tower includes a suitable alignment receiver or transmitter means 24 which cooperates along a line of sight 26 with a shorebased transmitter or receiver means 28 located on an embankment 30. In the form of alignment means shown in FIGURES 1 and 2, a surveying type transit arrangement is contemplated for use so that accurate alignment of the carriage on the sea bottom may be determined and maintained. However, it is fully within the scope of the present invention to contemplate the use of alignment mechanism employing a laser beam for the accurate remote control and guidance of the carriage 10 on the sea bottom over a predetermined path.

Figure 2:
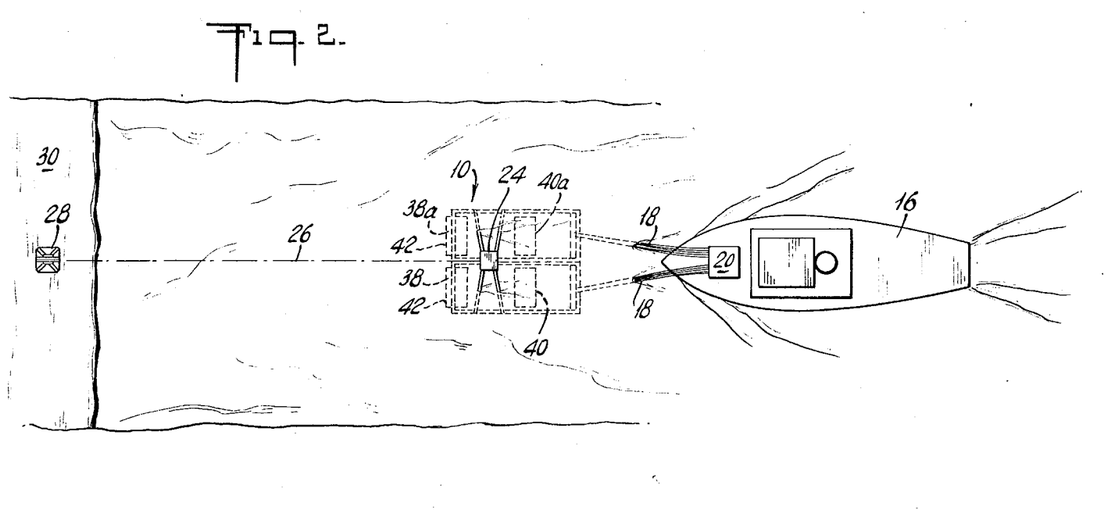
Figure 4:
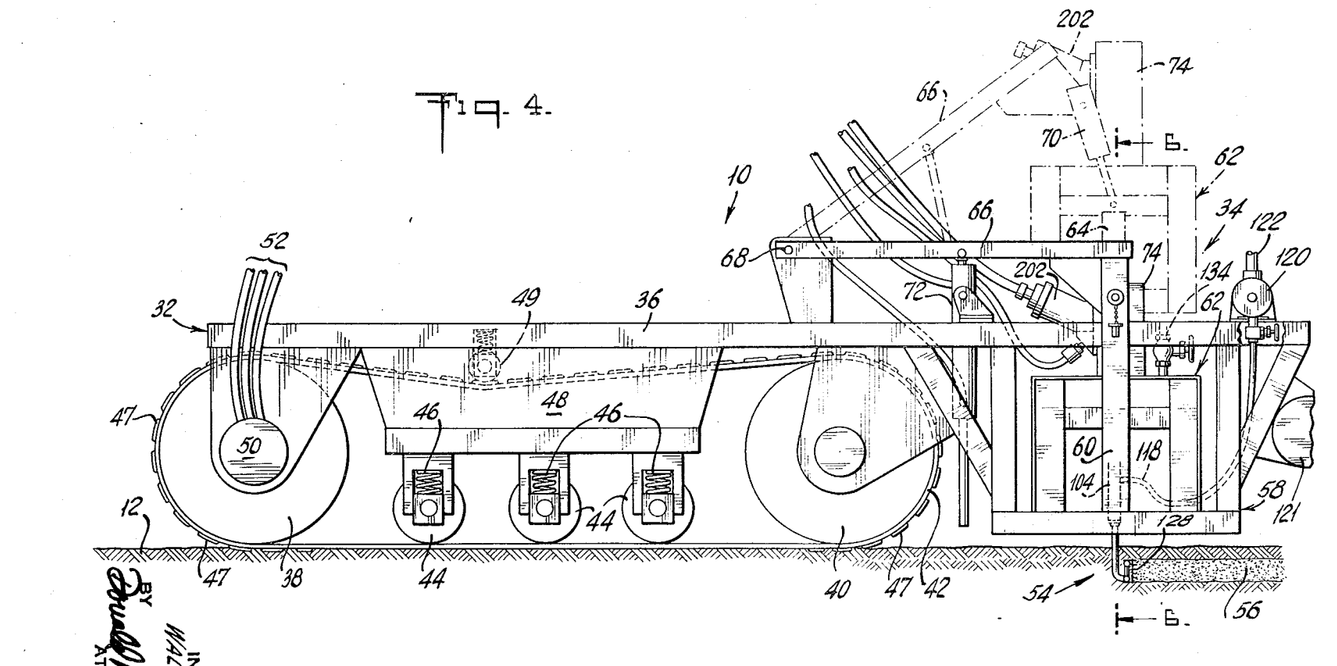
FIGURE 4 is a side elevation view of the mechanism of FIGURE 3 showing the injection means in a lowered operative position on a supporting bed of granular material.
Figure 5:
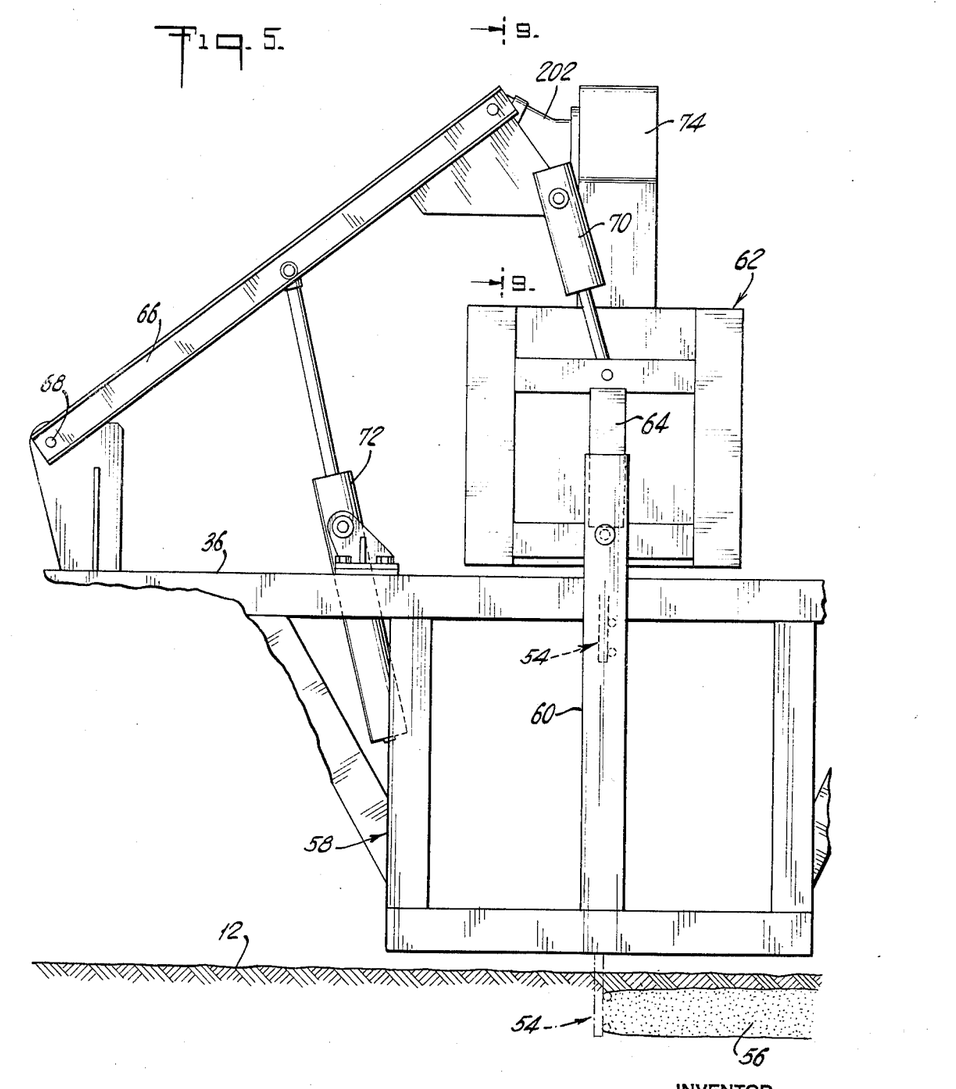
FIGURE 5 is an enlarged fragmentary portion of FIGURE 4 showing the injection means in a raised position upon the carriage.

Referring to the sand stabilization machine 10 in more detail in FIGURES 2, 3 and 4, it may be seen that it includes a propulsion carriage portion 32 having at one end thereof an overhanging injection section 34 attached and supported from an extended pair of cantilever side frame sections 36 of the carriage 32. The carriage 32 includes a front drive roller means 38 and 38a and a pair of rear roller drive means 40 and 40a. A pair of endless belts or tracks 42 are wrapped around the respective pairs of front and rear drive rollers 38 and 40 and 38a and 40a to form a twin track propulsion arrangement. Suitable hydraulic motors such as the one shown at 50 are provided for at least each of the rollers 38 and 38a. The motor 50 may be supplied with hydraulic fluid through the hoses 52 from the control module 20 so that independent speed control of each of the respective endless tracks 42 may be obtained to thereby provide directional control over the machine on the sea bottom. The lower reach of the tracks 42 are provided with a plurality of bogie wheels 44 which are pressed downwardly by a plurality of coiled springs 46 to keep the raised cleats 47 of the belts in firm engagement with the bed 12. Each of the bogie wheel assemblies is suitably mounted from depending side plates 48 attached to the side rails 36. The top reach of each belt passes under a tension roller 49 which is spring loaded downwardly to maintain belt tensions about the end rollers.

The injection section 34 includes a depending vibrating screen assembly 54 which is effective when reciprocated in an up-and-down movement to affectively place the adjacent sand or granular material in vibration therewith to fluidize the sand so that a binder such as an asphalt emulsion mixture may be injected into the sand into the zone 56. The injection of a binder material is effective to bind the sand granules together and stabilize the sea bottom in such a manner that if high currents and tidal action occurs, only the sand above the layer 56 will be subject to shifting movement. The screen 54 is supported from a vibrator assembly 62 which is slidably movable in a vertical direction relative to a supporting framework shown generally at 58. The vibrator assembly 62 includes, at opposite ends, a pair of keys 64 (see FIGURE 6) which cooperate with a pair of vertically disposed U-shaped channels 60, 60 on opposite ends of the framework assembly 58. The entire vibrator assembly 62 may be raised to an uppermost retracted or inoperative position shown in FIGURE 3 by the combined action of a pivot arm 66 attached at one end by a pin 68 to the carriage frame 36 and at the other end through a linkage 70 to an upper portion of a pair of crossbars 88. The pivot arm 66 is rotated about the pin 68 by the operation of a pair of hydraulic actuators 72 from the raised position shown in FIGURE 3 to the operative or lowered position shown in FIGURE 4. In this way the vibrating screen 54 may be readily withdrawn from contact with the sea bed so that the mobile carriage may be moved more readily over the sea bottom to the desired point of treatment. A buoyancy tank 121 is attached to the end of the carriage frame 36. The tank may be partially or completely filled with air to provide buoyancy as required to obtain optimum balance and traction on the surface of the sea bed.

The vibrator assembly 62 includes a vibration imparting mechanism shown generally at 74 which will be described in more detail hereafter with reference to FIGURES 9 through 14. However, the vibratory output of the mechanism 74 is transmitted directly through a flexible seal 132 to the mechanism interior of a sealed enclosure 76. The sealed enclosure 76 is effective to surround the great majority of the moving elements of the injection mechanism with a water tight enclosure so that the interior of the enclosure may be purged of all water by application of a gas under pressure through an air inlet connection designated 134 (see FIGURE 6).

Figure 6:
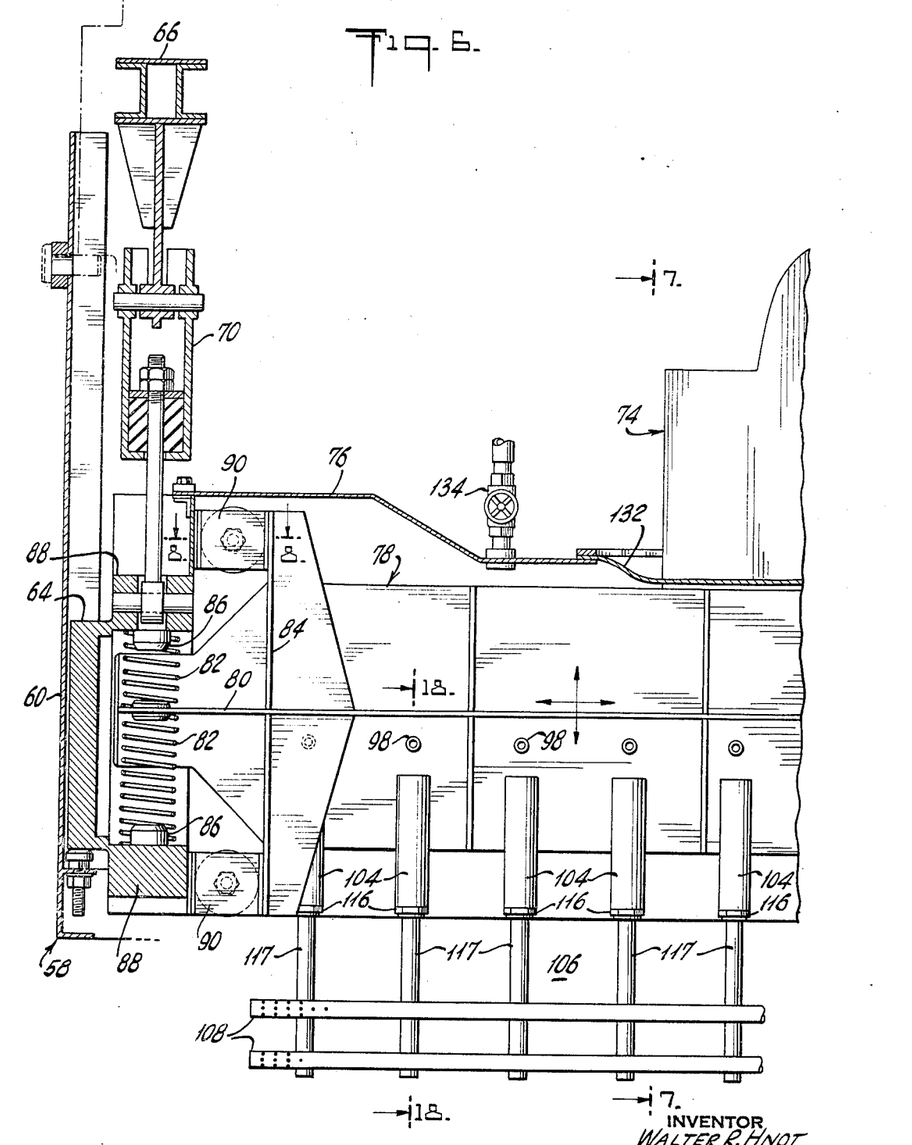
FIGURE 6 is a fragmentary cross-sectional view taken along line 6—6 of FIGURE 4.
Figures 7, 8:
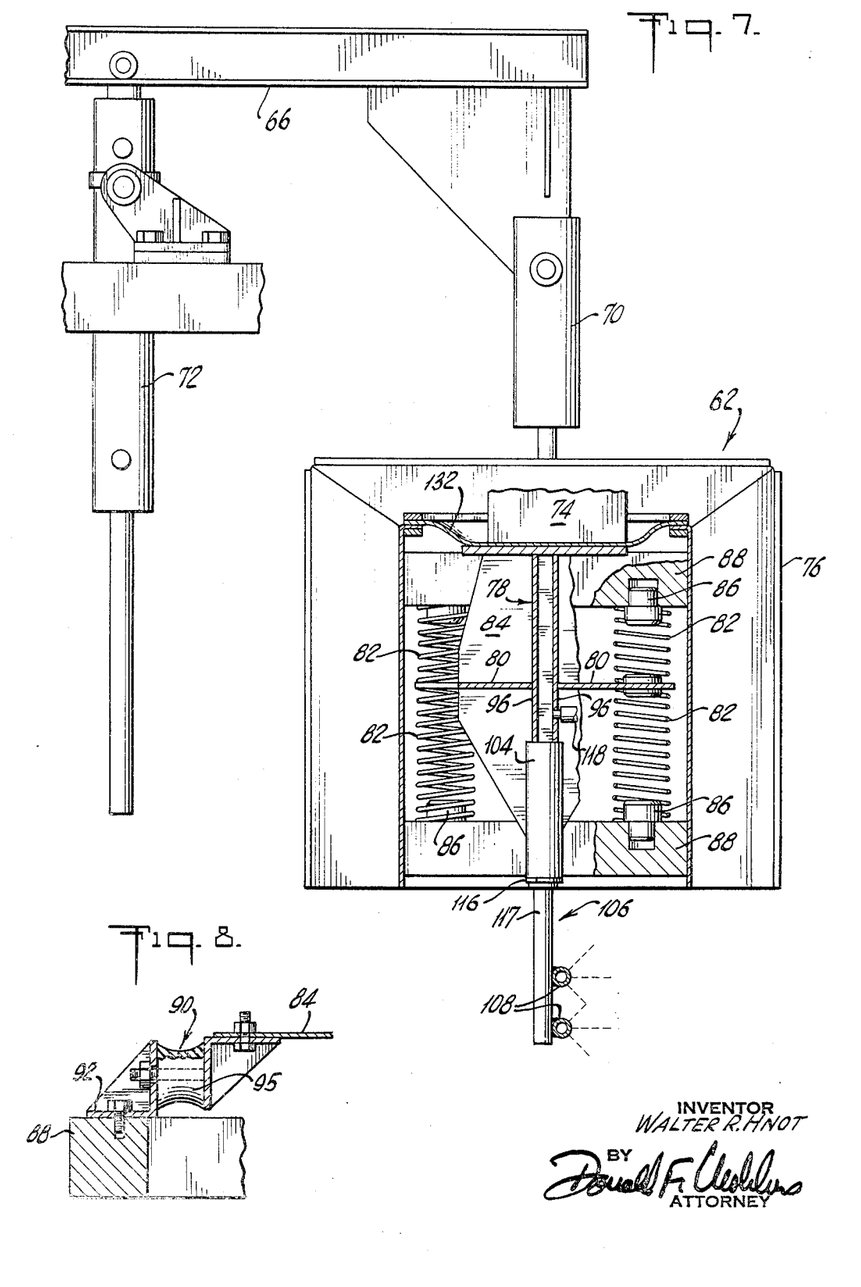
FIGURE 7 is a cross-sectional view taken along line 7—7 of FIGURE 6.
FIGURE 8 is a fragmentary cross-sectional view taken along line 8—8 of FIGURE 6.
Figure 9:
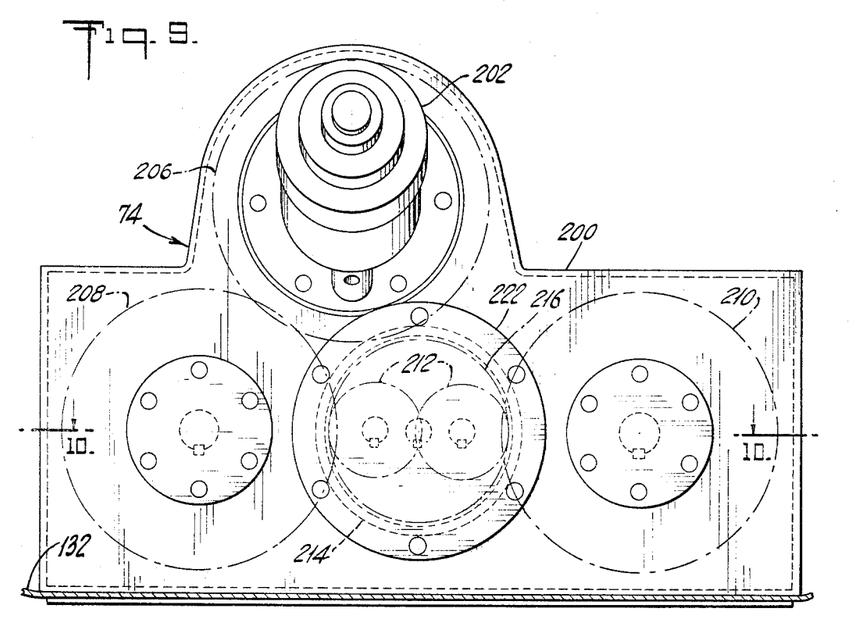
FIGURE 9 is a view of the vibration imparting mechanism looking in the direction of the arrows 9—9 in FIGURE 5.
Figure 10:
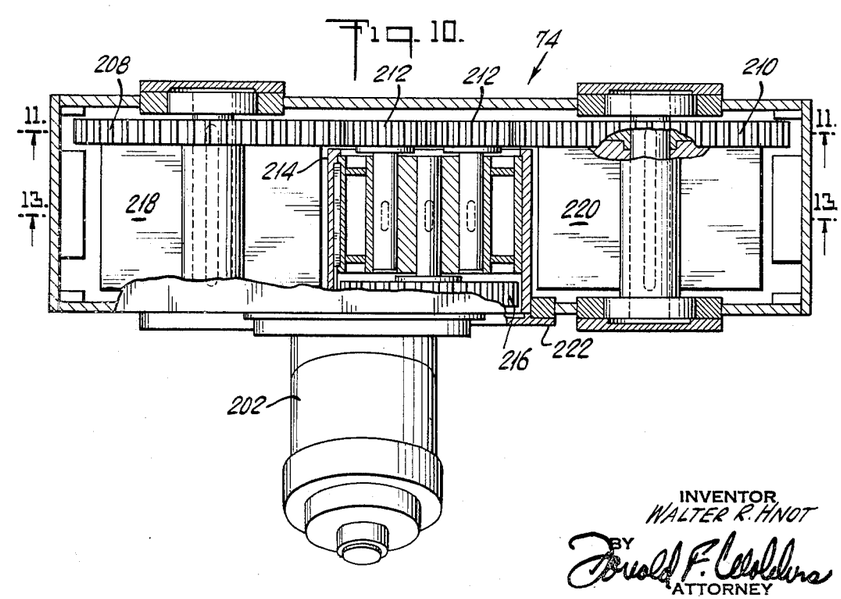
FIGURE 10 is a cross-sectional view of the vibrating mechanism taken along line 10—10 of FIGURE 9.

Referring to FIGURE 6 in more detail, the vibrator mechanism 74 is attached directly to a transversely extending "I" beam 78 which includes a horizontally extending stiffening web 80 (see FIGURE 7). The end portions of the web 80 cooperate with four coil springs 82 to resiliently mount the "I" beam 78 relative to the supporting upper and lower cross bars 88 of the vibrator assembly 62. The ends of the springs 82 are held in alignment by centering bosses 86 engaging the cross bars 88. The "I" beam 78 also includes a pair of end plates 84 which provide a mounting surface for a plurality of flexible mounts 90 at each end of the beam. The flexible mountings 90 (see FIGURE 8) are connected at one end to the end plate 84 of the beam 78 and at the opposite ends to a bracket 92 which is fixedly attached to the cross arm 88. The central bolt 95 extending through the interior of the flexible mounting 90 passes through an enlarged aperture 94 in the bracket 92 so that relative movement between the cross bar 88 and the beam end plate 84 is possible under the influence of the vibrator mechanism 74. In operation, the movements of the vibrator mechanism 74 are transmitted to the beam 78 which vibrates as a unit relative to the cross bars 88 in a vertical as well as lateral direction as permitted by the freedom of the flexible mountings 90. The springs 82 support the major load of the vibration assembly relative to the cross bars 88 while the flexible mounts 90 permit limited movement of the beam 78 in a vertical as well as horizontal plane.

Figures 18, 19, 20, 21, 22, 23:
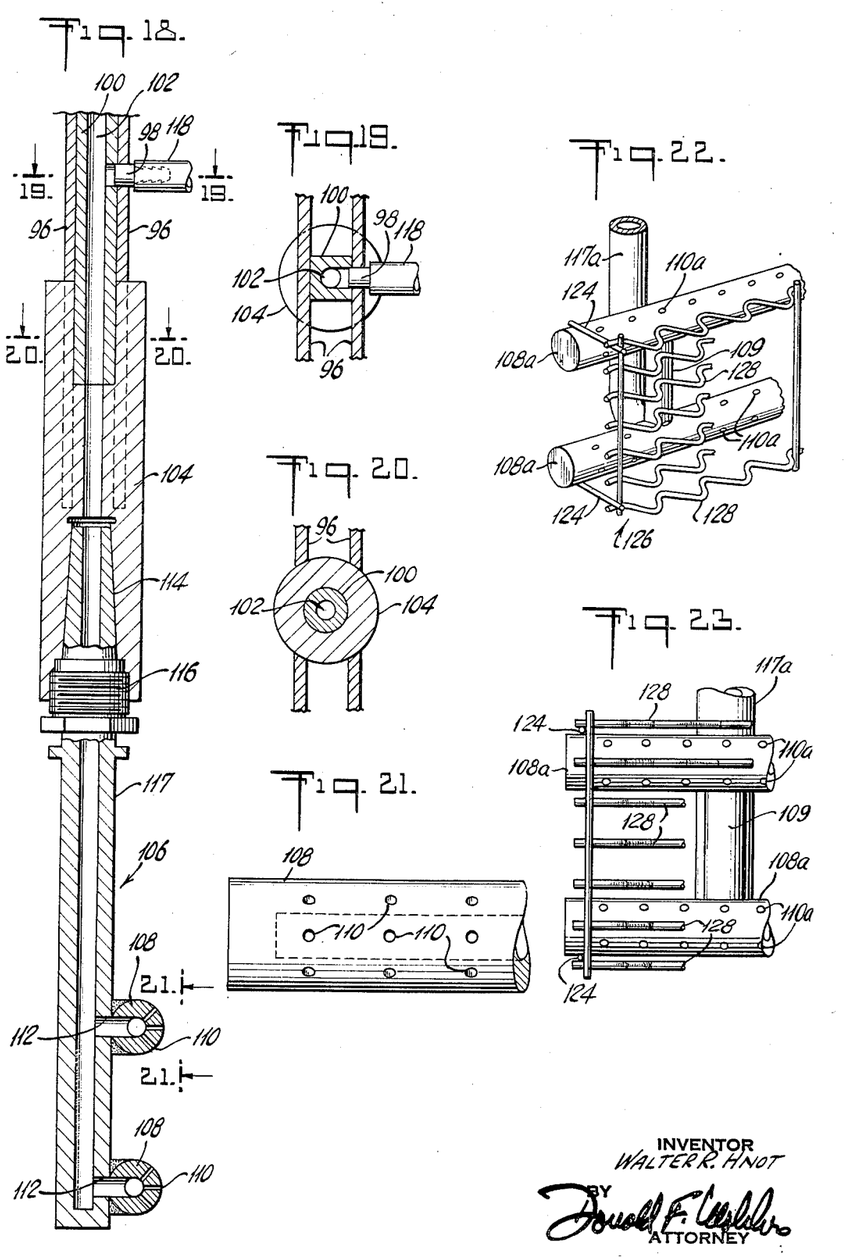
FIGURE 18 is a vertical cross-section of the vibrating injection means taken along line 18—18 of FIGURE 6.
FIGURE 19 is a sectional view taken along line 19—19 of FIGURE 18.
FIGURE 20 is a sectional view taken along line 20—20 of FIGURE 18.
FIGURE 21 is a view of a portion of FIGURE 18 looking in the direction of the arrows 21—21.
FIGURE 22 is a view similar to FIGURE 18 showing a modified form of injection mechanism.
FIGURE 23 is a front elevation view of the modified form of the injection mechanism of FIGURE 22.

Referring in more detail to the specific construction of the I beam 78, reference should be made to FIGURES 7 and 18–23. In FIGURES 7 and 18 it may be seen that the beam includes a pair of spaced plates 96, one of which includes a plurality of horizontally aligned binder receiving nipples 98. The passage through the nipple 98 communicates with the interior of a square spacer 100 which separates the plates 96. Each of the nipples 98 has associated therewith a corresponding spacer element 100 including a central passageway 102 which will be understood to be closed at its upper portion (not shown). Binder solution, such as an asphalt emulsion, therefore entering the nipple 98 through its associated flexible hose 118 will, therefore, pass downwardly through the aperture 102 in the spacer 100 into its respective tubular coupling member 104. The tubular coupling member 104 includes a conical seat 114 which is held fast by a threaded assembly 116. Each coupling member 104 is connected to a vertical conduit 117 to thereby feed emulsions to a discharge head assembly 106. The head assembly 106 includes a pair of transverse discharge tubes 108 having a plurality of orifices or discharge openings 110. Each of the discharge openings 110 communicates through the horizontal passageway of its respective tube 108, through the passageway 112, with the interior passageway of the conduits 117 at their points of intersection and attachment. In this way, the binder emulsion fluid entering the nipples 98, through the tubes 118 under pressure, is forced downwardly through the tubes 117 and outwardly at a substantially constant ejection pressure through each of the plurality of apertures 110. The provision of the threaded nut assemblies 116 permits the easy removal of the entire discharge head assembly 106 from the vibrating beam 78 should replacement thereof be necessary.

Referring to FIGURES 22 and 23, a preferred form of discharge head is shown wherein a plurality of depending conduits 117a curve at their lowermost end to communicate with a horizontally extending tube 108a. The material thus entering the interior of the tube 108a is free to exit through a plurality of apertures 110a therein as well as rise upwardly through a plurality of connecting tubes 109 (not shown) to a second upper tube 108a which also includes a plurality of discharge orifices 110a. It should be noted, however, that the vibrating screen mechanism of FIGURES 22 and 23, in addition, carries a plurality of rearwardly extending rods 124 which carry a corrugated grid structure 126. The grid structure 126 includes a plurality of horizontal wires 128. In operation, the movement of the beam 78 and its associated depending conduits 117a and 108a in association with the grid 126 is effective to fluidize the adjacent sand so the binder emulsion may be easily jetted outwardly from the apertures 110a. The use of the auxiliary offset grid structure 126 is effective to fluidize the sand material directly in the path of the jet of emulsion to obtain optimum said fluidizing and binding efficiency.

In operation of the invention, when the vibrating screen 54 is displaced vertically (and also horizontally if desired) within the bed of sand material 12, it is effective to fluidize the sand particles surrounding the transverse tubes 108, particularly in the area of the downstream vibrating grid structure 126. As the carriage assembly travels along the bed 12 in a direction toward the left in FIGURE 4, the asphalt emulsion binder emitted from the screen 54 is effective to intimately mix and bind together the fluidized sand particles into a cohesive layer 56. By selecting suitable conditions such as frequency and amplitude of screen vibration, it is possible to maintain a fluidized cavity below the sand-water interface while the water remains relatively undisturbed or only slightly disturbed. This is important in avoiding or reducing loss of binding material applied for binding the sand. Obviously, if the layer of material were fluidized completely to the surface of the bed, a loss of the binder material into the surrounding water might occur. As shown, the binder is effectively injected into the vibrating cavity and dispersed between the sand particles to form a coherent mass which becomes compacted again upon removal of the vibratory effect as the carriage moves away. It has been found that a frequency of vibration of 2100 cycles per minute and higher is effective to fluidize the adjacent sand particles sufficiently to accomplish effective stabilization.

Figure 11:
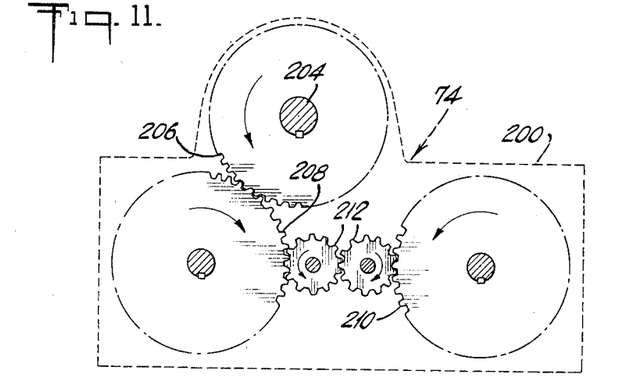
FIGURE 11 is a cross-sectional view of the vibrating mechanism taken along line 11—11 of FIGURE 10.
Figure 12:
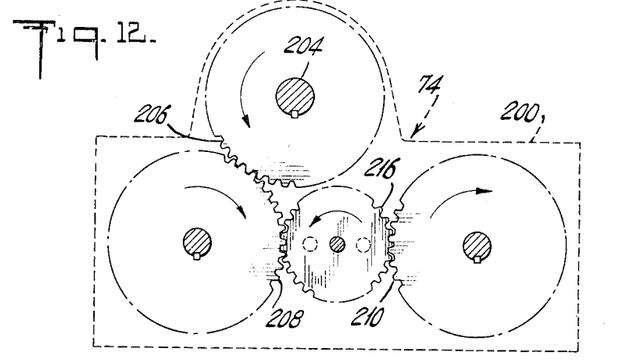
FIGURE 12 is a view similar to FIGURE 11 with an alternate gearing arrangement for the vibrating mass.
Figure 13:
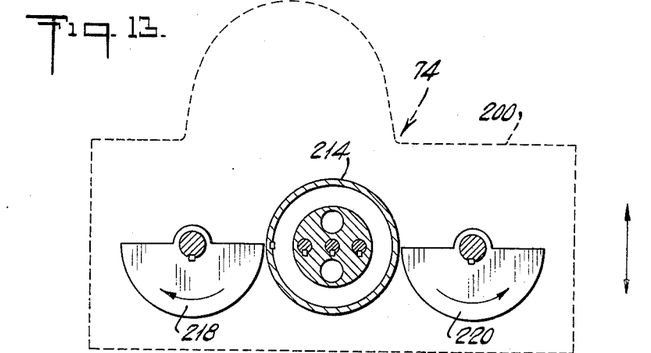
FIGURE 13 is a schematic cross-sectional view taken along line 13—13 of FIGURE 10.
Figure 14:
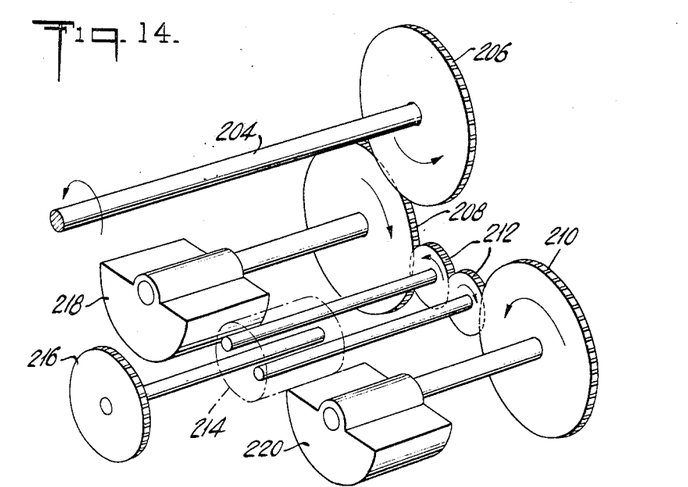
FIGURE 14 is a diagrammatic perspective view of the vibration mechanism.
Figure 15:
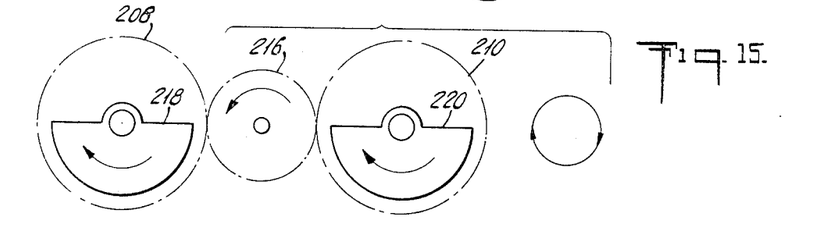
FIGURES 15, 16 and 17 are diagrammatic views of various types of motions that may be imparted to the injection mechanism by adjustment of the vibration mechanism.
Figure 16:
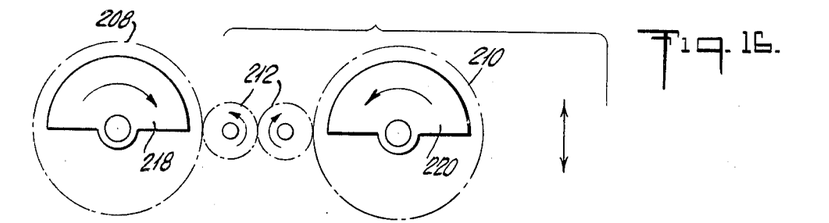

Referring to FIGURES 9 through 17 inclusive, a fuller understanding of the detailed operation of the vibrator mechanism 74 may be readily had. The vibrator mechanism 74 includes a main housing 200 mounting a plurality of rotating shafts and gears. An exterior wall of the housing 200 carries a main hydraulic motor 202 having a rotary output shaft connected through suitable means to the shaft 204 (see FIGURE 14). The schematic perspective view of FIGURE 14 will be understood to detail the operation of the relative parts of the vibrator mechanism. Referring to FIGURE 14, a main drive gear 206 is secured to the end of the shaft 204 and rotates in the indicated direction and engages a similar gear 208. The gear 208 meshes with and drives a pair of intermediate idler gears 212 which also rotate in the indicated directions to impart rotational motion to the spur gear 210. Each of the gears 208 and 210 carry at the opposite end of their shafts a pair of unbalanced rotating masses designated respectively 218 and 220. A bearing block assembly 214 provides a bearing support for the respective rotary shafts of the intermediate idler gears 212. In the operation of the gearing arrangement of FIGURE 14, the counterclockwise rotation of the main drive gear 206 is effective to impart clockwise rotation to gear 208 and counterclockwise rotation to gear 210. In this manner opposite directions of rotation are imparted to weights 218 and 220 as indicated in the arrangement of FIGURES 11, 14 and 16 with the resultant forces being created on the housing 200 and "I" beam 78 to produce either elliptical movement as shown in FIGURE 16 or a variation thereof which may be obtained by suitable positioning of one of the weights 218 and 220 relative to the other by disengagement and re-engagement of the idler gear with the weights in different relative positions to one another.

When it is desired to produce pure vertical movement such as represented in FIGURE 13 opposite directions of rotation of the weights 218 and 220 are selected. It will be seen that a straight vertical movement will thus be maintained of the frame due to the opposing equal and opposite phasing of the weights. Accordingly, when each of the weights has rotated 90° from the position indicated, the lateral forces on the frame 200 of the right hand weight will exactly cancel out the left hand centrifugal force of the left hand weights 218. Accordingly, the frame will move vertically only and a corresponding movement of the "I" beam 78 will result as permitted by the freedom of the resilient flexible mounts 90 and the springs 82.

With the relationship of the weights in FIGURE 16 where the direction of rotation is opposite and in phase with one another, a preferred form of movement is obtained which is effective to impart a maximum vertical movement to the "I" beam 78 on its flexible mount supports. It will be apparent, therefore, that the energy transmitted to the sand adjacent the injection means 58 will have a maximum vertical component.

Figure 17:
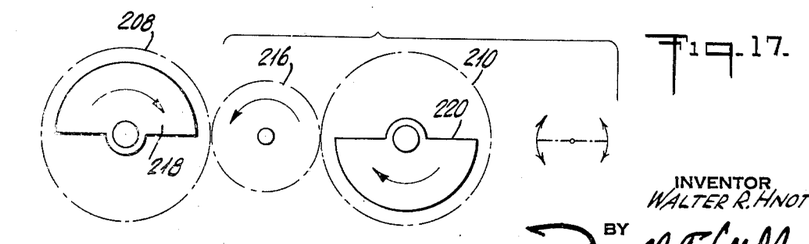

In the arrangement of FIGURES 15, 17 and 12, a change in the gearing of the respective drives of the weights has been effected so that the direction of rotation for each of the weights is the same and, in this instance, clockwise. This rotation direction change is obtained by the minor disassembly of the gearing arrangement by the removal of the rear plate 222 (FIGURE 9) from the housing 200 to expose the as yet unused alternate intermediate idler gear 216. The mechanical arrangement is such that the bearing block 214 may be removed as an assembly and re-inserted in a reverse fashion so that the previously unused gear 216 meshes directly with the main gears 208 and 210 in place of the previous two idler gears 212. In this way it will be readily seen that the direction of rotation of the weights 218 and 220 is now the same. When the weights are driven in the same direction, and their unbalance is in phase, as in FIGURE 15, a resultant rotary motion is produced which is in turn imparted to the injection head 106 in contact with the sand to be fluidized. When the phasing of the unbalanced masses 218 and 220 is as shown in FIGURE 17, a rocking motion pattern will be imparted to the injection apparatus. Obviously, almost any desired preferred motion may be obtained by the proper phasing and rotation of the masses 218 and 220.

While a specific embodiment of the invention has been shown and described in detail to illustrate the application of the inventive principles, it will be understood that the invention may be embodied otherwise without departing from such principles. In particular, while the invention has been described as being employed to stabilize a submerged sea bed, those skilled in the art will readily appreciate its utility in stabilizing shifting surface desert areas or any other granular materal capable of being put into a fluidized state.

What is claimed is:

1. A machine for binding together a non-cohesive granular material comprising; mobile carriage means for traveling upon the surface of the granular material, and means attached to said carriage for injecting a liquid binder into said granular material, said injection means including a frame, a transverse member, a fluid pressure tight chamber attached to said frame and surrounding the sides and upper portion of the transverse member, flexible means for mounting said member from said frame whereby said member can move in two dimensions relative to said frame, vibrating motor means fixedly attached to said transverse member, and downwardly depending conduit means having discharge apertures therein attached to said transverse member for vibration therewith whereby a liquid binder may be injected through said conduit means and discharge apertures into the granular material surrounding said conduit means.

2. A machine in accordance with claim 1 including means for pressurizing the interior of said chamber with a gaseous material so that when said machine is operated under water a minimum of energy will be transmitted by said transverse member to the surrounding water.

3. A machine in accordance with claim 1 wherein said vibrating motor means includes a pair of rotating unbalanced masses for imparting an oscillating movement in two directions to said transverse member.

4. A machine in accordance with claim 3 including means for varying the direction of rotation of one of said masses relative to the other of said masses and for varying the phasing of the unbalancing of said masses so that variations in the degree of movement of said transverse member relative to said frame may be obtained.

5. A machine in accordance with claim 1 including wire screen means attached to said conduit means for vibration therewith to assist in the fluidizing of the adjacent granular material.

6. A machine in accordance with claim 1 wherein said wire screen means includes a horizontal array of wires spaced downstream of said conduit means in the path of the binder material emitted from said apertures.

7. A machine in accordance with claim 6 wherein said wires are corrugated in form.

8. A machine in accordance with claim 1 wherein said mobile carriage means includes at least one endless trackway for contacting engagement with, and travel over, the layer of non-cohesive granular material to be treated, said carriage means further including drive motor means contained thereon for propelling said carriage means.

9. A machine in accordance with claim 1 including lifting means connected to said injecting means to raise the injecting means relative to said carriage means from a lowered operative position to a raised inoperative position.

10. A machine in accordance with claim 9 wherein said carriage means includes a pair of endless track means and means for individually controlling the respective rate of speed of said track means to provide directional control of said machine over the surface of the granular material.

11. A machine in accordance with claim 10 including upstanding alignment means attached to an upper surface of the carriage means for indicating the position thereof above the surface of a fluid surrounding said carriage means so that accurate alignment and control of the carriage means relative to a point of reference may be maintained.

12. A machine for binding together a non-cohesive granular material comprising, mobile carriage means for traveling upon the surface of the granular material; and means attached to said carriage for injecting a liquid binder into said granular material, said injection means including a frame, a transverse member, a fluid pressure tight chamber attached to said frame and surrounding the sides and upper portion of the transverse member, means for pressurizing the interior of said chamber with a gaseous material so that when said machine is operated under water a minimum of energy will be transmitted by said transverse member to the surrounding water, flexible means for mounting said member from said frame whereby said member can move in two dimensions relative to said frame, vibrating motor means fixedly attached to said transverse member, and downwardly depending conduit means having discharge apertures therein attached to said transverse member for vibration therewith whereby a liquid binder may be injected through said conduit means and discharge apertures into the granular material surrounding said conduit means.

References Cited

UNITED STATES PATENTS

| 1,523,660 | 1/1925 | Reno | 61—69 |
| 2,766,629 | 10/1956 | Booth | 94—48 X |
| 2,912,828 | 11/1959 | Gerwick | 61—52 |
| 3,408,819 | 11/1968 | Delfosse | 61—63 X |

JACOB SHAPIRO, Primary Examiner

U.S. Cl. X.R.

61—1, 63, 69, 72.3; 94—48; 111—7, 7.2; 172—699